US010885783B2

(12) United States Patent
Klenk et al.

(10) Patent No.: US 10,885,783 B2
(45) Date of Patent: Jan. 5, 2021

(54) GENERATING COLLABORATIVELY OPTIMAL TRANSPORT PLANS

(71) Applicant: Palo Alto Research Center Incorporated, Palo Alto, CA (US)

(72) Inventors: Matthew Klenk, San Francisco, CA (US); Victoria M. Bellotti, Oakland, CA (US); Filip Dvorak, San Francisco, CA (US); Shiwali Mohan, Palo Alto, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 200 days.

(21) Appl. No.: 16/024,208

(22) Filed: Jun. 29, 2018

(65) Prior Publication Data
US 2020/0005638 A1 Jan. 2, 2020

(51) Int. Cl.
*G08G 1/0968* (2006.01)
*G01C 21/34* (2006.01)

(52) U.S. Cl.
CPC ... *G08G 1/096838* (2013.01); *G01C 21/3423* (2013.01); *G01C 21/3469* (2013.01); *G01C 21/3484* (2013.01); *G01C 21/3492* (2013.01)

(58) Field of Classification Search
CPC .......... G08G 1/096838; G01C 21/3492; G01C 21/3484; G01C 21/3423; G01C 21/3469; G06Q 10/00
USPC ....................................................... 701/425
See application file for complete search history.

(56) References Cited

U.S. PATENT DOCUMENTS

| | | | | |
|---|---|---|---|---|
| 2008/0154452 A1* | 6/2008 | Kapp | ..................... | B61L 3/006 701/20 |
| 2008/0221787 A1* | 9/2008 | Vavrus | ............... | G01C 21/3469 701/423 |
| 2010/0088012 A1* | 4/2010 | O'Sullivan | ........ | G01C 21/3469 701/532 |
| 2010/0114473 A1* | 5/2010 | Kono | ................. | G01C 21/3469 701/532 |
| 2010/0268450 A1* | 10/2010 | Evanitsky | .......... | G01C 21/3423 701/533 |
| 2012/0054028 A1* | 3/2012 | Tengler | .............. | G01C 21/3697 705/14.49 |
| 2015/0106001 A1* | 4/2015 | Lee | ..................... | G01C 21/3626 701/123 |
| 2015/0134226 A1* | 5/2015 | Palmer | .................. | B60W 40/10 701/101 |
| 2015/0228129 A1* | 8/2015 | Cox | ..................... | G07C 5/0808 701/29.1 |

(Continued)

*Primary Examiner* — Muhammad Shafi
(74) *Attorney, Agent, or Firm* — Womble Bond Dickinson (US) LLP

(57) ABSTRACT

Systems and methods described receive a request for a transportation plan for a user, wherein the request comprises a starting point and an ending point for a route and generate a set of potential transportation plans for the route. The systems and methods determine an estimated travel time and an estimated fuel consumption for at least a first subset of plans in the set of potential transportation plans and estimate an impact on a transportation system of at least a second subset of plans in the set of potential transportation plans. Based at least in part on the estimated time, the estimated fuel, and the estimated impact on the transportation system, a plan is selected.

20 Claims, 7 Drawing Sheets

(56) References Cited

U.S. PATENT DOCUMENTS

2016/0109251 A1* 4/2016 Thakur .............. G01C 21/3415
　　　　　　　　　　　　　　　　　　　　705/335
2017/0146362 A1* 5/2017 Bai .................... G01C 21/3469
2018/0045527 A1* 2/2018 Baker ................ G01C 21/3469

* cited by examiner

US 10,885,783 B2

GENERATING COLLABORATIVELY OPTIMAL TRANSPORT PLANS

STATEMENT OF GOVERNMENT SUPPORT

This invention was made with Government support under Contract No. DE-AR0000612 Multi-agent Trip Planning And Personality Based Influencing To Reduce Energy awarded by the Advanced Research Projects Agency-Energy (ARPA-E). The Government has certain rights in this invention.

TECHNICAL FIELD

Implementations of the present disclosure relate to data collaborative planning of transportation routes.

BACKGROUND

The use of systems to generate transportation plans from one location to another can enable users to navigate in unknown areas without the need for a map, asking for directions, knowledge of local transportation options, or planning ahead. However, such transportation plans may not be optimal for user preferences or the transportation system through which the individual is navigating.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
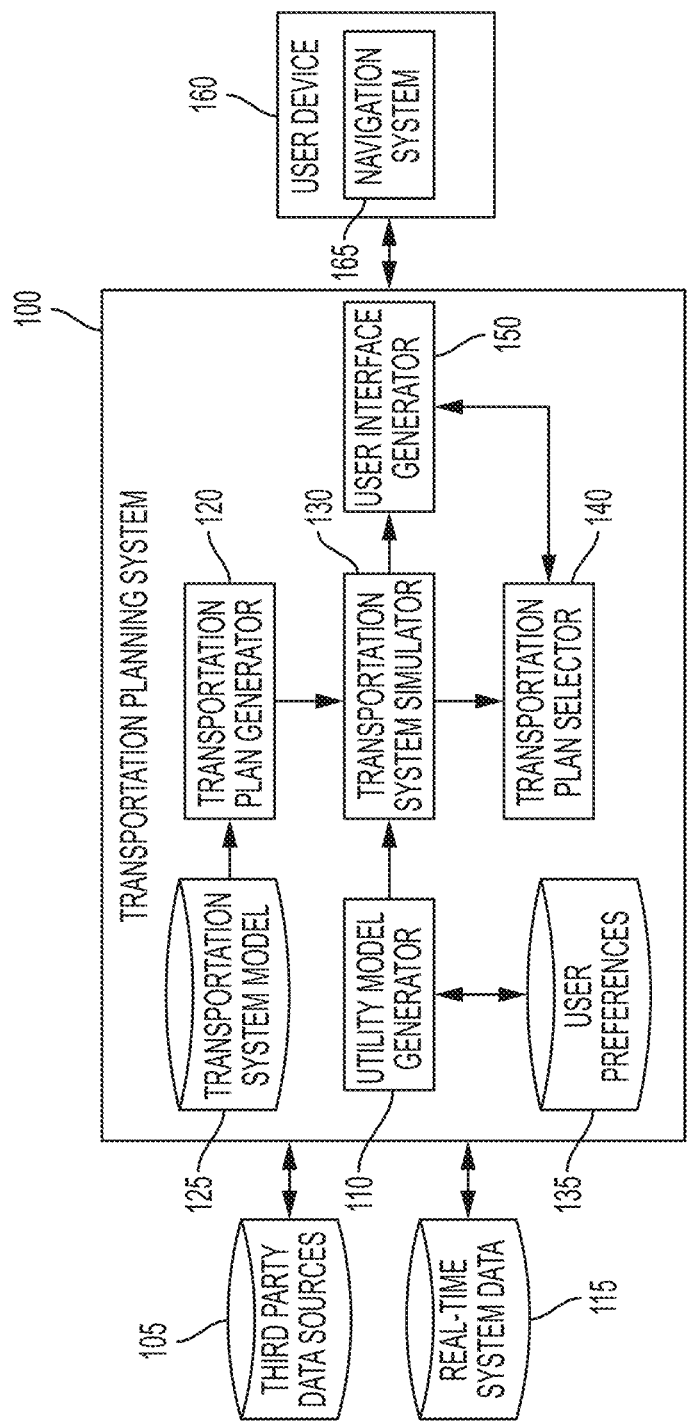
FIG. 1 is a schematic diagram of an embodiment of systems to generate a transportations plan, which can be used in accordance with some embodiments.

Described herein are navigation systems providing recommended routes that provide improvements for both individual commuters and travelers as well as for transportation systems as a whole. While some systems can provide optimized routes for individuals, those recommendations can make transportation systems within a particular region less efficient for overall time of those using it as well as consume more energy as a whole. Accordingly, those systems provide potential gains for those using them and fewer overall benefits for transportations systems.

Systems and method described herein combine user models of transportation preferences, multi-modal transportation models, and energy models to identify routes that are acceptable to individuals that save energy and time, and therefore money across the entire transportation network. Some embodiments incorporate transportation system modeling with individual user utility modeling, based upon their explicit, implicit, or other expressed needs to generate personalized multi-modal transportation recommendations. Multi-modal transportation system include a variety of types of transportation means to get from one place to another within a geographic area. Multi-provider transportation systems incorporate different private providers into single plans. Utility modeling can capture a wide range of factors that might be important, favored, or otherwise have a preference to a user. In some embodiments, the system modeling captures the effects of those decisions on other travelers. In some embodiments, the systems and methods described can be used as mobility-as-a-service providers such as ride sharing services, mobility-as-a-service infrastructure services, transportation demand management automakers, smart city services, transportation departments, such as transit authorities or the like, or other users monitoring usage of transportation systems.

As travelers select which way to travel to a destination, they may have more options that fit their needs than they realize. Those needs can be based upon travel time, ease of travel, general activity per day, or other factors. Additionally, those travelers may not understand how choices in travel modes and routes affect other travelers in the same transportation system. To improve these issues, systems may utilize a user model with time, cost, comfort, ability to work, amount of exercise involved, or the like as parameters of utility function which computes the utility for a route through a multi-modal transportation network. Furthermore, through knowledge of the routes of other travelers, the routes and utilities for particular travelers change.

A transportation planning system generates a set of alternative routes based on the transportation resources available to the user. For each route, a utility score is generated using the utility function for a user. The transportation planning system combines the utility score with estimated impact on a transportation system to rank possible multi-modal transportation routes. The transportation planning system can then determine acceptable routes based on the utility score as well as acceptable routes that reduce congestion, energy consumption, travel time, or the like for other travelers in a transportation system. The transportation planning system can also determine the impact on the number of people in a region of the transportation system. For example, the transportation planning system can attempt to increase travel through business or entertainment districts in order to increase revenue for stakeholders.

To generate a utility model for a user, the transportation planning system can use both implicit and explicit data regarding the user. Explicit data can include a user survey or other provided data from the user. For example, the user may indicate they do not own a bike, cannot walk to work, or the like. This data can rule out certain routes or modes of transportation as not being acceptable to the user. Implicit data can include data derived from other data sources. For example, the user may have health monitoring that indicates a low level of activity and increasing activity levels may be built into the user's profile. The transportation planning system may also use calendar events, past acceptance of routes, job titles, or the like to generate a user profile. The transportation planning system may also use route ratings by a user as an input to update the preferences of a user in an associated user profile.

By modeling all modes of transportation in terms of a utility model based on a user profile, the transportation planning system can generate a set of potential transportation plans that are predicted to be acceptable to a user. The utility model can optimize one or more features that are important to a user, such as travel time, traffic levels, fuel consumption, comfort, or others factors that contribute to a user's preferences during travel. In some embodiments, user preferences may be combined with other dynamic contextual conditions that make one more or less preferable over another, such as traffic density and slowdowns, weather, importance of arriving on time and so on.

As an example, Alice, a commuter from Potrero Hill, San Francisco to Palo Alto has a few options to get to work. She can drive during rush hour, or drive earlier or later to avoid traffic. She can take CalTrain from $22^{nd}$ Street and then catch a shuttle to work or call a ride-hailing taxi service from the Stanford station or take her bicycle and use that to get from Stanford or the Palo Alto station to her office. Depending on her planned departure time and her profile based on implicit or explicit needs, the transportation planning system can recommend cycling if her weekly activity level is low, taking a shuttle if the weather is bad, or another option based on other contexts.

Each potential transportation plan impacts other travelers both positively and negatively. The transportation planning system an estimate the impact of a transportation plan including time, congestion, fuel, carpool options, or other impacts on a transportation system or geographic area. Accordingly, the transportation planning system can select from a set of potential transportation plans that provide a high utility score for the user as well as the best estimated impact on the transportation system as a whole. Accordingly, the transportation planning system provides recommendations that are acceptable to a user and beneficial to a transportation system as a whole. As a utility model is updated for a user based on learned preferences, it can improve recommendations. The transportation planning system can also offer options to a user based on a model of the transportation system that may not be readily apparent to the user. In some embodiments, the transportation planning system may also provide the user with an indication of their estimated impact on a transportation system. In some embodiments, transportation planning authorities may also be provided with feedback indicating how changes to a transportation system can be utilized to reduce congestion, transit time, or energy consumption of users.

In some embodiments, the transportation planning system may provide the user with a recommended route, as well as other potential routes. The other potential transportation plans may include some that have a higher utility score for the user, but a worse impact on the transportation system. In some embodiments, other potential transportation plans may also include those with lower or similar utility scores as well as a better estimated impact on the transportation system.

In some embodiments, estimating the impact on the transportation system includes simulation of the transportation system. The simulation can be based on a model of the transportation system that includes a number of connected nodes and edges. The nodes can represent intersections of roads and connections between different modes of transportation. The edges can represent the distance, time, or energy consumption within those edges. In some embodiments, the simulation can determine an amount of time or energy consumed by the user or other travelers in the transportation based on the model. For example, if the user decides to travel and the travel includes time spent at an intersection, the transportation planning system can simulate the impact based on determination of the additional time and fuel consumption generated by the increase in the number acceleration and deceleration maneuvers of other vehicles that wait on the user.

FIG. 1 is a diagram showing a transportation planning system 100 that generates a transportation plan from a first location to a second location. In some embodiments, the transportation planning system 100 may also provide plans that take into account other future travel. The transportation planning system 100 can receive a request for a transportation plan from a user device. The request can be an explicit request for a transportation plan or can be inferred based on a routine that is followed by a user. The transportation planning system 100 can respond to the request by generating a set of transportation plans and selecting a preferred plan to provide to the user device 160. In some embodiments, the transportation planning system 100 may use additional resources such as remote data sources 105 and transportation system data 115 to generate the transportation plan. After a plan is selected by the transportation planning system 100, it can be provided back to the user device 160. The selected plan may account for an overall utility of the user as well as the impact of the selected plan on an overall transportation system.

In some embodiments, the transportation planning system 100 can include a utility model generator 110, a transportation system simulator 130, a transportation plan generator 120, a transportation plan selector 140 and a user interface generator 150. The utility model generator 110 generates a utility model for a user based on user preferences 135. The utility model generator 110 may also use additional remote data sources 105. The transportation plan generator 120 can generate a number of transportation plans that are available to travel from the first location to the second location. The transportation planning system 100 may also include a transportation plan selector 140 that selects a plan based on one or more of the utility model of the user and estimated impacts on the transportation system. The select plan can then be provided to the user device 160 through a user interface generator 150. Based on the selected plan, the user can choose whether or not to accept the selected plan. If the user selects the transportation plan, a navigation system 165 of the user device 160 can use the plan to direct the user to the requested destination.

The utility model generator 110 of the transportation planning system 100 can generate a model based on various types of data. For example, the utility model generator 110 uses user preferences 135 to generate a utility model. The user preferences 135 can include responses to a set of questions provided to a user. For example, the user may provide available transportation modes that the user has, preferred modes of transportation, fitness level, whether they work on commutes, or the like. The user preferences 135 can also include preferences derived from actions of the user. For example, the user preferences 135 may be updated based upon responses of the user device to proposed transportation plans. In addition, the user preferences 135 can generate preference from remote data sources 105 that pertain to the user. An example remote data source 105 can include a fitness tracker that counts steps for the user. If there is a change in the activity of the user, the user preferences 135 can be updated to indicate the user may want to exercise more. Other remote data sources 105 may include social networks of the user, preferences of users with similar demographics of the user, or other information provided by third party sources.

The user preferences 135 can then be used by the utility model generator 110. For example, the utility model generator 110 can provide weights for different factors that are preferred by a user. Accordingly, the utility model may generate a utility score for a transportation plan based on the total time, the fuel costs, the impact of the plan on the environment, modes of transportation, noise of transportation, or the like. In some embodiments, the utility score can be relative to other potential transportation plans for the user. The utility model can then be used by the transportation plan selector 140 to aid in selecting a transportation plan.

The transportation plan generator 120 generates multimodal transportations plans for the requested destination based on the transportation system model 125. The transportation system model 125 can include a virtual map of nodes and edges in a transportation system. The transportation system may be a particular geographic area or an area within which the locations of the requested transportation plan are located. The transportation system model 125 may include an amount of time taken to travel across an edge during different times of day and days of the week. The transportation system model 125 may also include congestion levels, average energy consumption for a transport across an edge, wait times at particular nodes, types of transfers at different nodes (e.g., which edges a traveler can move to at one node depending on which edge the traveler approached from), and the like. In some embodiments, other types of transportation system models may be used to generate transportation plans.

The transportation plan generator 120 then determines a set of potential transportation plans for the user to travel from one location to the desired location. In some embodiments the transportation plan generator 120 may generate plans that overlay the nodes and edges of the transportation system model 125. The transportation plan generator 120 may consider only the portions of the transportation system model 125 that have modes available to the user. For example, if the user preferences 135 indicate that the user cannot ride a bike, the transportation plan generator 120 may ignore those edges that require a bike to be practical. The transportation plan generator 120 may generate a number of potential plans as candidates for consideration by the transportation plan selector 140. In some embodiments, the request for a transportation plan may be received with time to generate, hundreds, thousands, tens of thousands, or more. The transportation planning system 100 can consider these plans according using a utility score for the plans as well as an estimated impact of the plans on the transportation system.

In some embodiments, a transportation system simulator 130 simulates one or more of the potential plans generated by the transportation plan generator 120. The simulation can provide estimated travel time, energy consumption, fuel costs, congestion, or the like. These can be generated through the simulation for the user as well as the marginal travel time, energy consumption, fuel costs, congestion, or the like that is added to the transportation system as a whole based on the addition of the travel by the user. For example, for each transportation plan generated by the transportation plan generator 120, the transportation system 130 can simulate the time and energy consumed at each edge and node of a transportation system model. Those consumption levels can be added up for the user. In addition, the total time, energy, and congestion of the transportation system with the potential transportation plan can be compared to a total of the transportation system without the user. Accordingly, the comparison provides a difference in the efficiency of the transportation system for different transportation plans based on these comparisons. In some embodiments, the transportation system simulator 130 additionally uses transportation system data 115. The transportation system data 115 can provide updated information about traffic, weather, public transportation schedules, or the like to the transportation system simulator 130. In some embodiments, the transportation systems data 115 can be pulled from a number of sources across a network. In some embodiments, the transportation system data 115 can also be part of remote data sources 105.

The transportation plan selector 140 can select one or more plans based on utility score and estimated impacts on the transportation system. For example, the transportation plan selector 140 can compare the plans to determine those with a utility score over a threshold and with a positive (or least negative) estimated impact on the transportation system. In some embodiments, the transportation plan selector 140 may select those potential plans that have the highest percentile utility score compared to the other potential plans. The transportation plan selector 140 may also only consider those transportation plans with a highest percentile estimated impact on the transportation system. In some embodiments, the utility scores and the estimated impact on the transportation system may be combined with a weighting factor to select a recommended transportation plan that provides both high utility for a user as well lower estimated fuel consumption, energy costs, congestion, or the like for a transportation system.

The user interface generator 150 can provide the selected plan to the user device 160 for the user to decide whether to use the plan. In some embodiments, more than one selected plan may be provided to the user device 160 with an indication of costs and benefits of each of the selected plans. The user interface generator 150 may communicate with a user device 160 through text messaging, email, a dedicated app, a navigation system 165, or other communication techniques. Example user interfaces are shown in FIGS. 2-5 below.

The user device 160 can be a user computing device such as a smartphone, personal computer, GPS system, in-vehicle navigation system, or another system. In some embodiments, the transportation planning system 100 may be executed on user device 160. For example, the transportation planning system 100 may operate using hardware resources of the user device 160. In some embodiments, the transportation planning system 100 can operate on a host server separate from the user device. Upon receiving a selected transportation plan, the user device 160 can provide a user interface to the user. The user device then receives an indication of whether to proceed with the recommended transportation plan. In some embodiments, the user device 160 can then provide the transportation plan to a navigation system 165 and follow directions on the user device 160. In some embodiments, if the user does not accept the proposed route, the transportation planning system 100 can provide alternative or other routes to the user device. In some embodiments, the user device 160 may revert to another navigation system 165 in response to declining the selected transportation plan.

Figure 2:
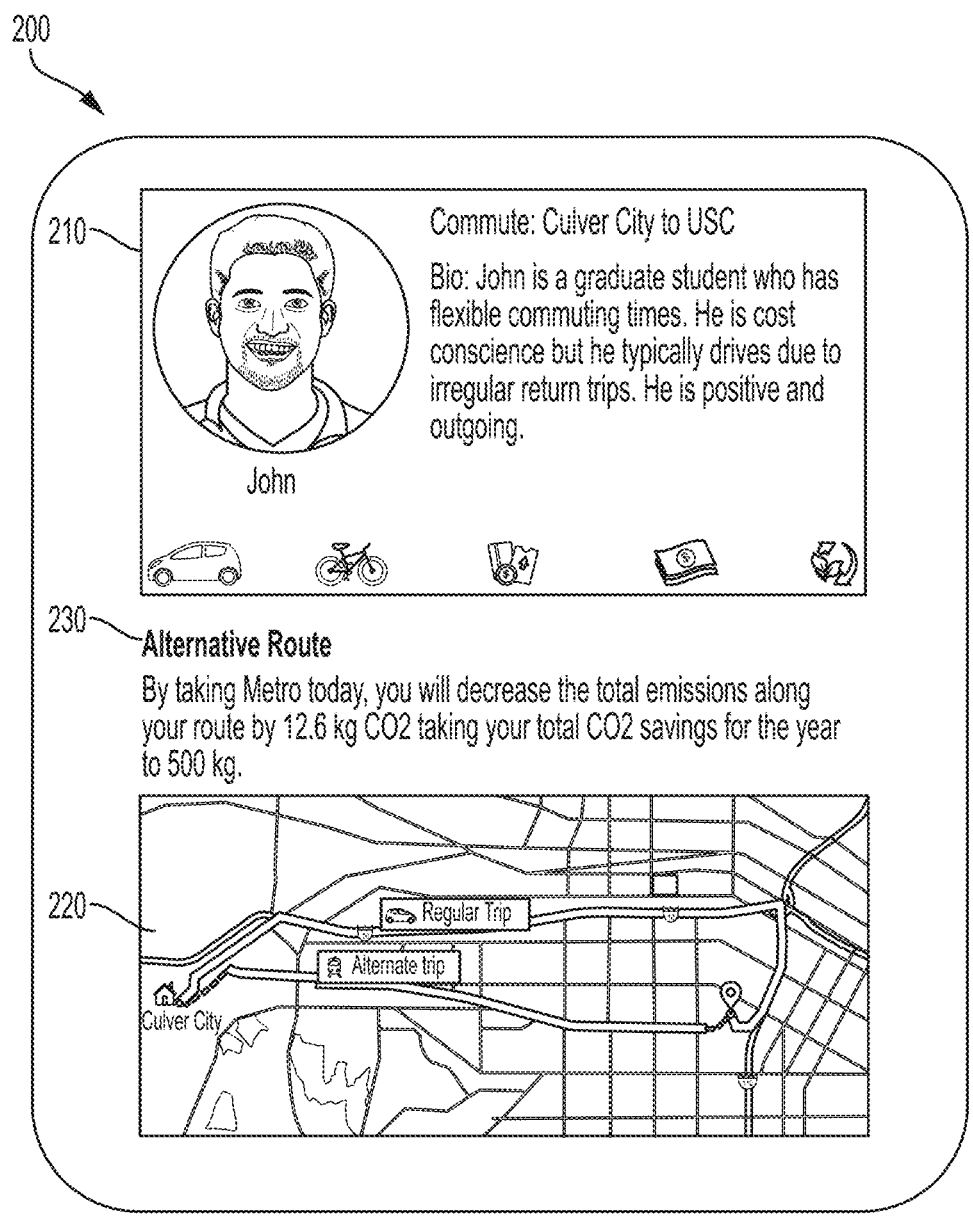
FIG. 2 is a user interface including a transportation plan, which can be analyzed in accordance with some embodiments.

FIG. 2 is an example user interface 200 that may be provided on a user device according to aspects of the disclosure. In some embodiments, the user interface 200 may be provided on a user device, for example as discussed with reference to FIG. 1. For example, the user interface 200, or data populating the user interface 200, may be provided by a user interface generator 150 of a transportation planning system 100 as described with reference to FIG. 1. Although shown with particular features, the user interfaces shown in FIG. 2 may include fewer, additional, or different features than those that are shown. For example, user interface 200 may not include profile information of the user.

The user interface 200 includes a description 210 of a user profile of the user. In some embodiments, the user may update their profile with additional information. A transportation planning system can then update a utility model for the user accordingly. The user interface also includes a map 220 showing the user an alternative transportation plan. The map 220 includes a normal route for the user as well as an alternative trip. The alternative trip may be provided to the user based on a selected transportation plan generated by a transportation planning system as described with reference to FIG. 1. In addition to the map, the user interface 200 may include a description 230 of the changes to the transportation plan and the estimated impact of those changes. As shown in FIG. 2, the change to taking the metro reduces emissions compared to the normal transportation methods. In some embodiments, the user interface 200 may also include one or more controls for the user to accept or decline the transportation plan provided.

Figure 3:
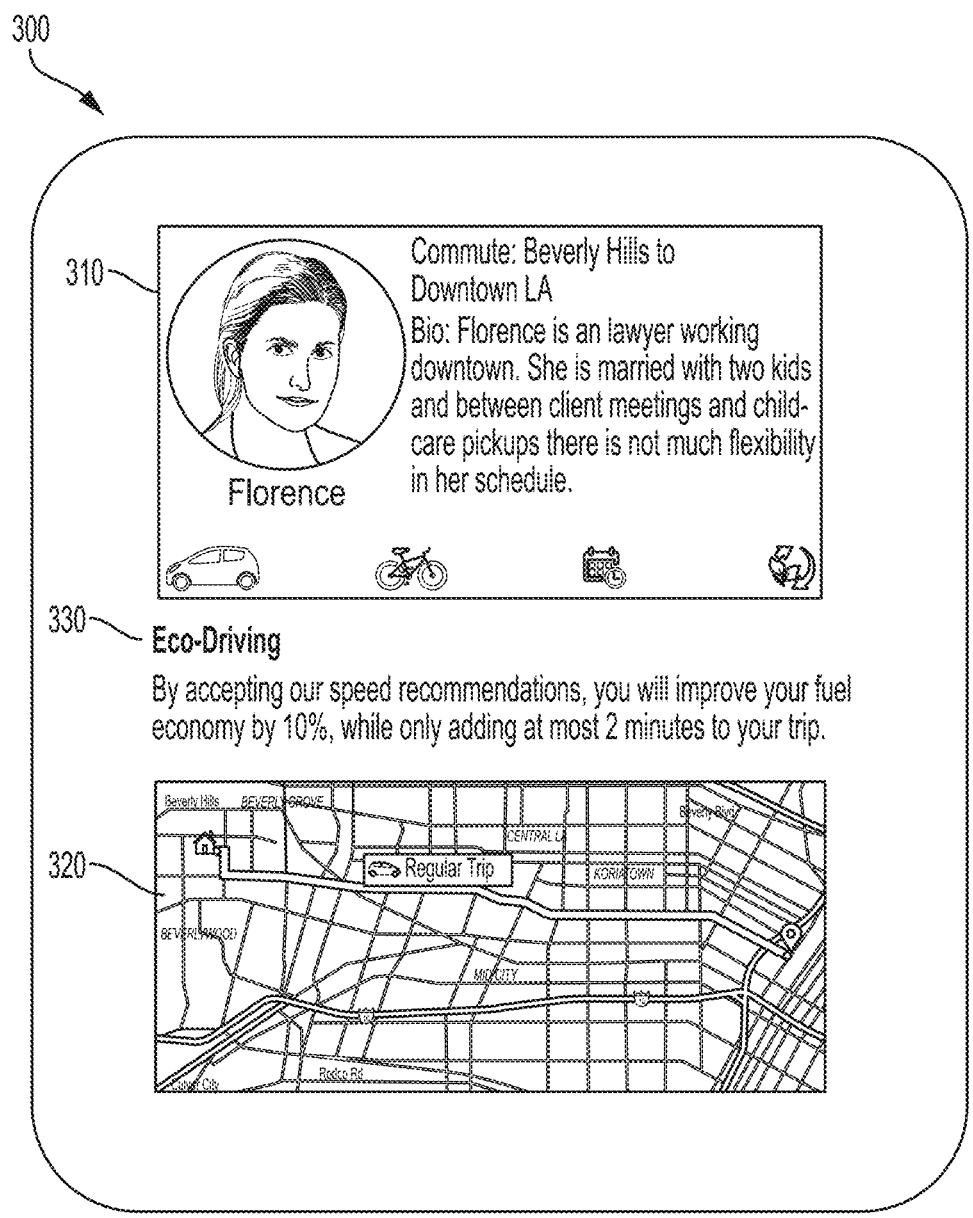
FIG. 3 is a user interface including a transportation plan, which can be analyzed in accordance with some embodiments.

FIG. 3 is an example user interface 300 that may be provided on a user device according to aspects of the disclosure. In some embodiments, the user interface 300 may be provided on a user device, for example as discussed with reference to FIG. 1. For example, the user interface 300, or data populating the user interface 300, may be provided by a user interface generator 150 of a transportation planning system 100 as described with reference to FIG. 1. Although shown with particular features, the user interfaces shown in FIG. 3 may include fewer, additional, or different features than those that are shown. For example, user interface 300 may not include profile information of the user.

The user interface 300 includes a description 310 of a user profile of the user. In some embodiments, the user may update their profile with additional information. A transportation planning system can then update a utility model for the user accordingly. The user interface also includes a map 320 showing the user an alternative transportation plan. The map 220 shows the normal route taken by the user. However, the route has been updated to include a recommendation 330 regarding the driving habits of the user. The recommendation is to accept the driving speeds of the user. The description shows the benefit of the slower speeds to the user. This may be determined based on comparison of a potential transportation plan to the normal transportation of the user. In some embodiments, the user interface 300 may also include one or more controls for the user to accept or decline the transportation plan provided.

Figure 4:
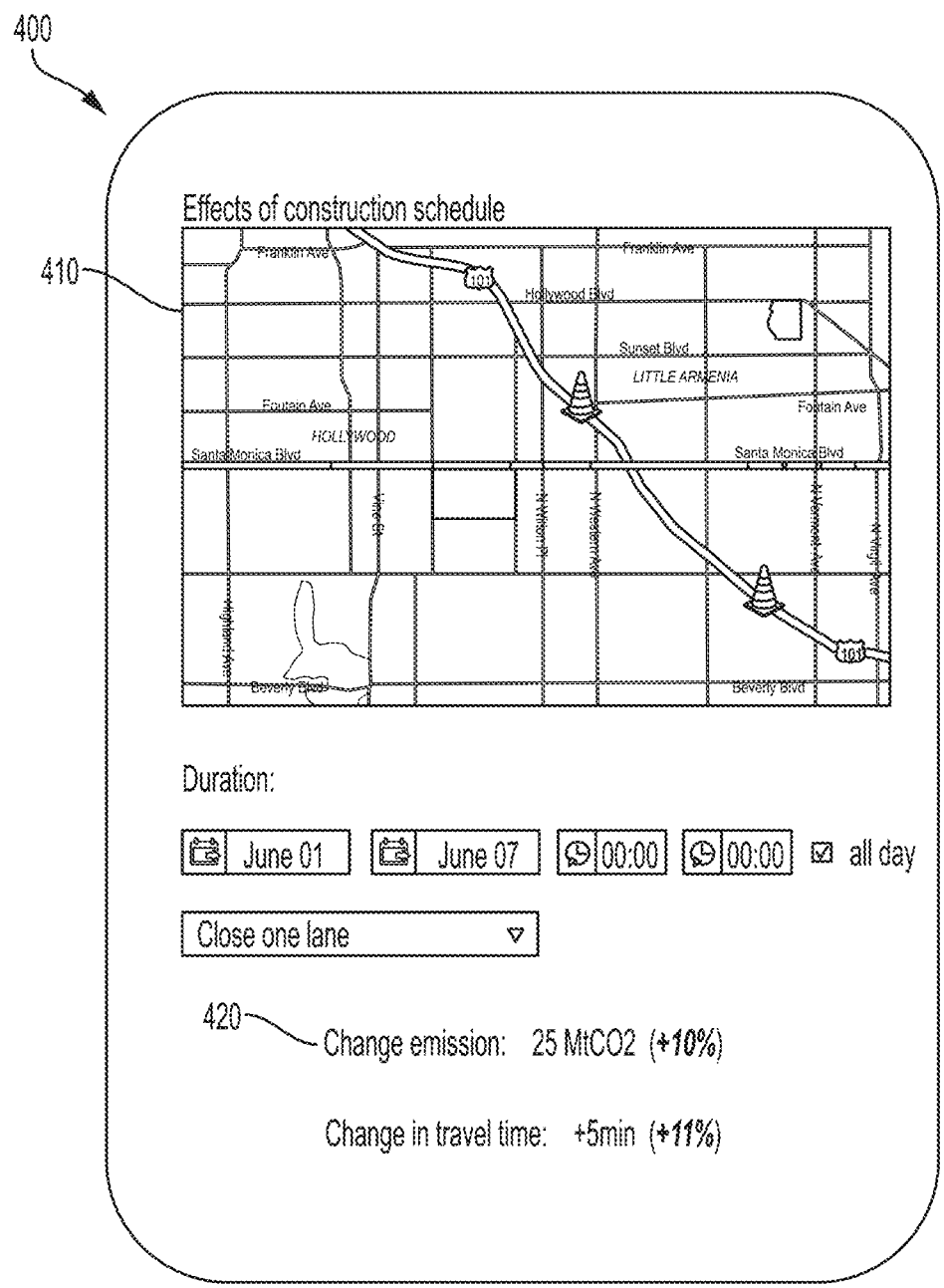
FIG. 4 is a user interface including impact on a transportation system, which can be analyzed in accordance with some embodiments.

FIG. 4 is an example user interface 400 that may be provided on a user device according to aspects of the disclosure. In some embodiments, the user interface 400 may be provided on a user device, for example as discussed with reference to FIG. 1. For example, the user interface 400, or data populating the user interface 400, may be provided by a user interface generator 150 of a transportation planning system 100 as described with reference to FIG. 1. Although shown with particular features, the user interfaces shown in FIG. 4 may include fewer, additional, or different features than those that are shown.

The user interface 400 includes a map 410 showing construction in a transportation system. The map can include areas where the construction is going to occur as well as other areas that are affected by the construction. In some embodiments, a transportation planning system 100 may generate the map based on potential changes to the transportation system model based on the construction. For example, the construction may have predictable changes to the edges and nodes of affected areas. By changing those edges and nodes, the change in the transportation from the construction can be predicted. The transportation planning system can also provide a description 420 of the change in emissions and average travel time within the transportation system. In some embodiments, other information such as change in users of public transportation, change in energy consumption, or the like may also be provided with user interface 400.

Figure 5:
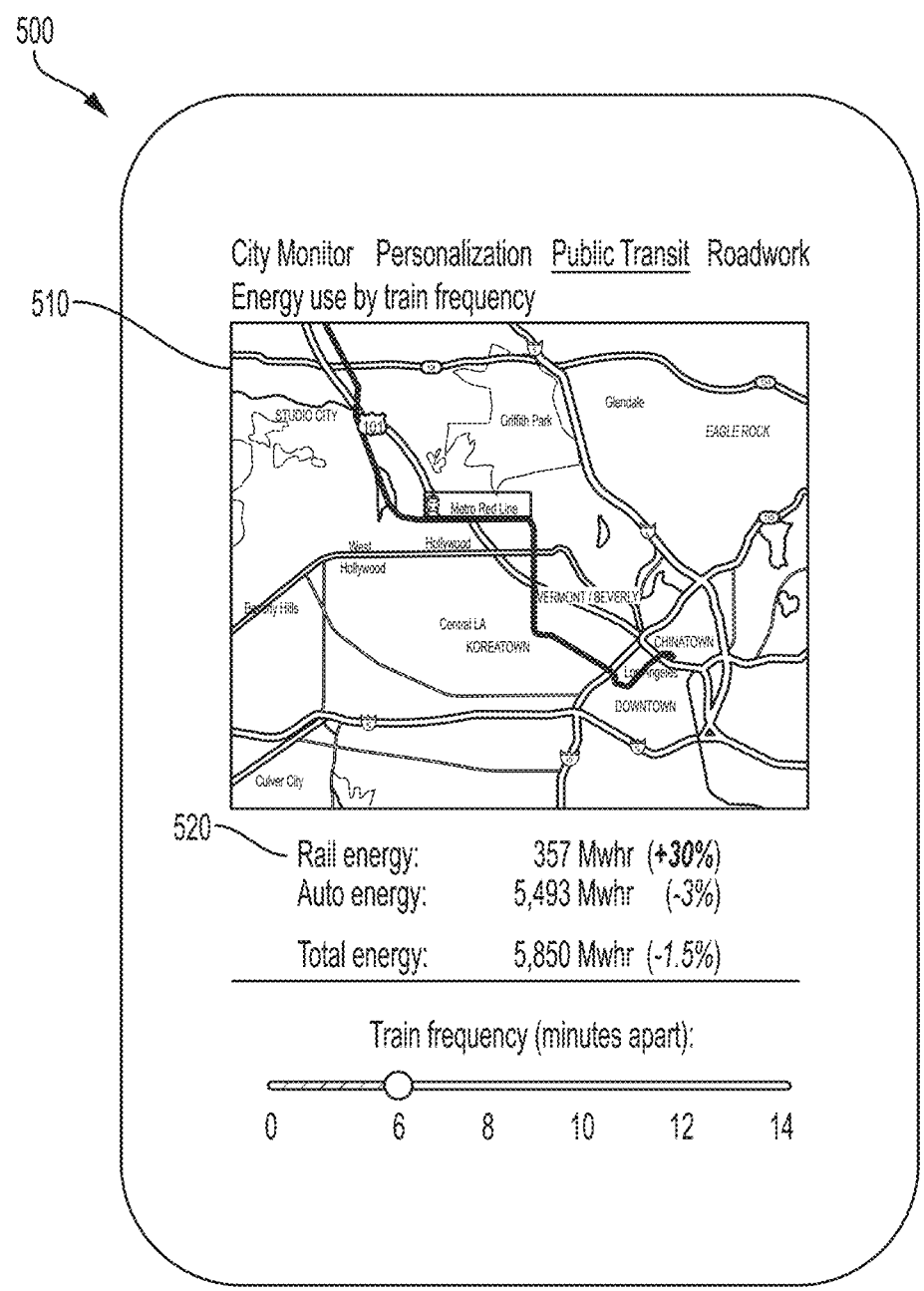
FIG. 5 is a user interface including impact on a transportation system, which can be analyzed in accordance with some embodiments.

FIG. 5 is an example user interface 500 that may be provided on a user device according to aspects of the disclosure. In some embodiments, the user interface 500 may be provided on a user device, for example as discussed with reference to FIG. 1. For example, the user interface 500, or data populating the user interface 500, may be provided by a user interface generator 150 of a transportation planning system 100 as described with reference to FIG. 1. Although shown with particular features, the user interfaces shown in FIG. 5 may include fewer, additional, or different features than those that are shown.

The user interface 500 includes a map 510 showing aspects of a transportation system. The map can include a description of different modes of transportation. For example public transportation systems may be shown within the transportation system. In some embodiments, a transportation planning system 100 may generate the map based on updates to the transportation system model based on changes to train, bus, or other modes of transportation. For example, the changing the frequency of a mode of scheduled transportation may have predictable changes to the edges and nodes of affected areas. By changing those edges and nodes, the change in the transportation from the change in the mode of transportation can be predicted. The transportation planning system can also provide a description 520 of the change in energy consumption within the transportation system. The description 520 may also show where the energy consumption is changing. In some embodiments, other information such as change in users of public transportation, change in emissions, or the like may also be provided with user interface 500.

Figure 6:
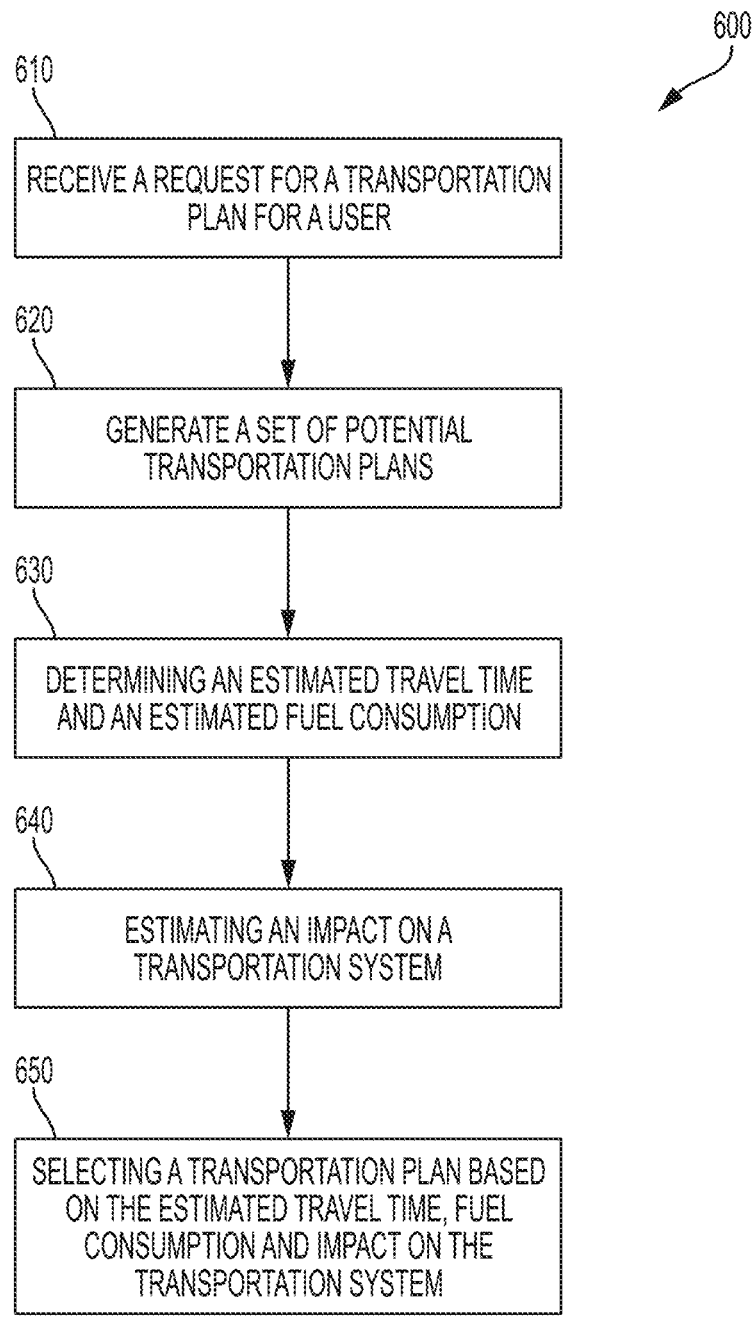
FIG. 6 is a flow diagram of an embodiment of a method of generating transportation plan, in accordance with some embodiments.

FIG. 6 is a flowchart 600 illustrating example operations of a transportation planning system. For example, the processes described with reference to FIG. 6 may be performed by a transportation planning system 100 as described with reference to FIG. 1. Beginning at block 610, the transportation planning system receives a request for a transportation plan for a user. The request may include a starting point and ending point of a route that is requested. In some embodiments, the request may be given explicitly by a user, or it may be predicted based on a routine of the user.

In block 620, the transportation planning system generates a set of potential transportation plans for the user. The transportation plans may be based on a transportation system model for the area the user is located. In some embodiments, the potential transportation plans may be limited to modes of transportation that are available to a particular user. In some embodiments, the transportation plans may be generated by a transportation plan generator 120 as described with reference to FIG. 1.

In block 630, the transportation planning system determines an estimated travel time and estimated fuel consumption for at least a first subset of plans in the set of potential transportation plans. In some embodiments, the estimations may be generated through simulation of the transportation plans within the transportation system model. In some embodiments, only one of an estimated travel time or estimated fuel consumption may be estimated. Furthermore, additional factors such as calories burned, congestion experiences, or the like may be estimated for the transportation plans. In some embodiments, the estimations for the plan may be combined based on user preferences into a personal utility score for the plans.

In block 640, the transportation planning system estimates an impact on a transportation system of at least a second subset of plans in the set of potential transportation plans. The second subset may be those with the best utility scores or predicted user acceptance for the plans. The impact on the transportation system may be compared among the plans to determine which plans have the largest impact on the transportation system. In some embodiments, the transportation planning system estimates the impact in term of one or more of emissions, energy consumption, average travel time, congestion, accidents, or the like within the transportation system.

In block 650, the transportation planning system selects a plan based at least in part on the estimated time, the estimated fuel, or the estimated impact on the transportation system. In some embodiments, the plan may be selected based on other estimations. Furthermore, the user profile may be used to determine which factors to consider more strongly for a user. For example, some users may have strict time requirements and the estimated time may be given a higher weight according to a user profile. In some embodiments, the transportation planning system may select the plan based on a utility score and estimated impact on the transportation system.

Various operations are described as multiple discrete operations, in turn, in a manner that is most helpful in understanding the present disclosure, however, the order of description may not be construed to imply that these operations are necessarily order dependent. In particular, these operations need not be performed in the order of presentation.

Figure 7:
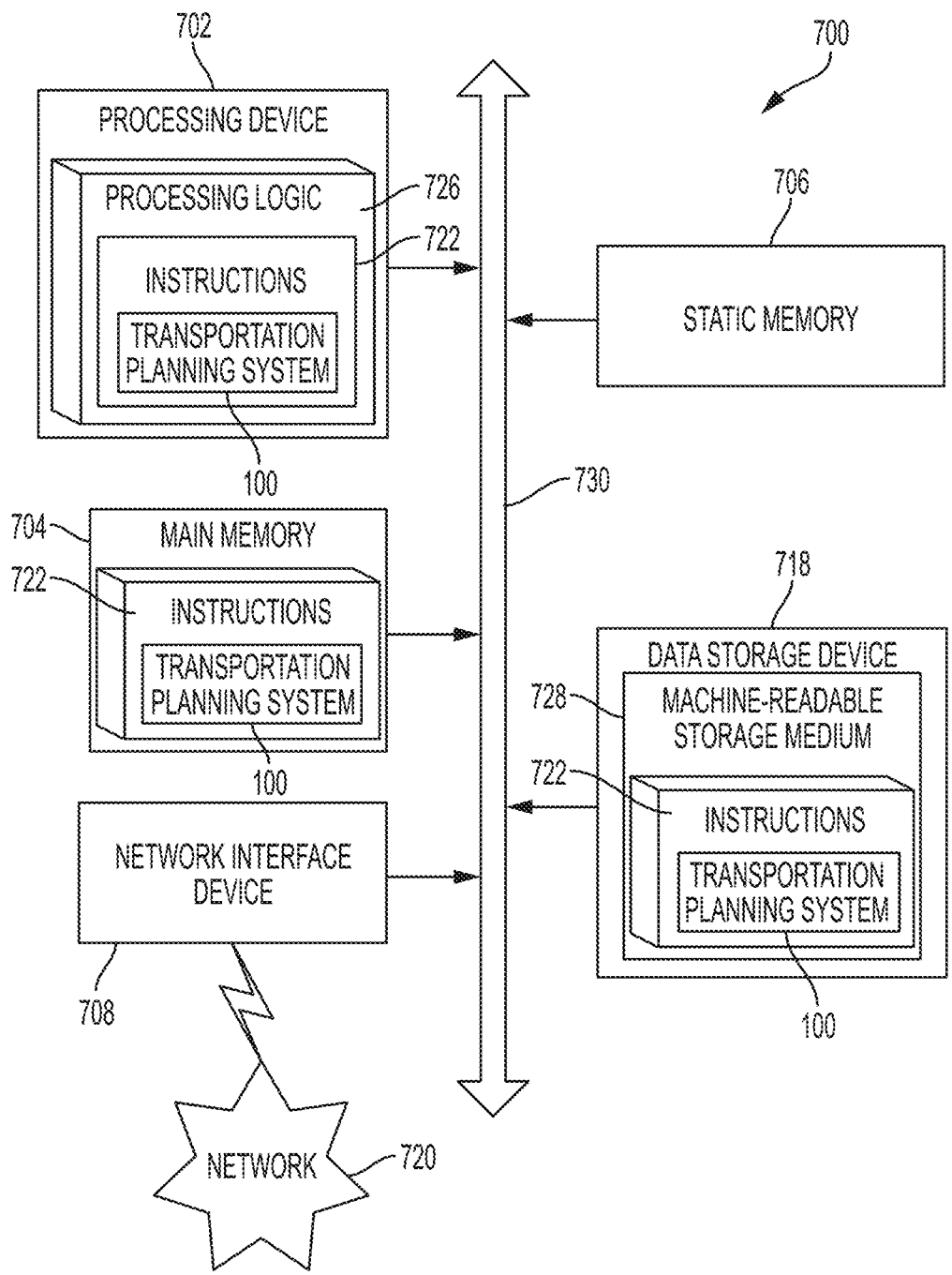
FIG. 7 is an illustration showing an example computing device which may implement the embodiments described herein.

FIG. 7 illustrates a diagrammatic representation of a machine in the example form of a computer system 700 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may be representative of a server computer system, such as transportation planning system 100.

The exemplary computer system 700 includes a processing device 702, a main memory 704 (e.g., read-only memory (ROM), flash memory, dynamic random access memory (DRAM), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute processing logic 726, which may be one example of transportation planning system 100 shown in FIG. 1, for performing the operations and steps discussed herein.

The data storage device 718 may include a machine-readable storage medium 728, on which is stored one or more set of instructions 722 (e.g., software) embodying any one or more of the methodologies of functions described herein, including instructions to cause the processing device 702 to execute transportation planning system 100. The instructions 722 may also reside, completely or at least partially, within the main memory 704 or within the processing device 702 during execution thereof by the computer system 700; the main memory 704 and the processing device 702 also constituting machine-readable storage media. The instructions 722 may further be transmitted or received over a network 720 via the network interface device 708.

The machine-readable storage medium 728 may also be used to store instructions to perform a method for analyzing log data received from networked devices, as described herein. While the machine-readable storage medium 728 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof

What is claimed is:

1. A method comprising:
    receiving a request for a transportation plan for a user, wherein the request comprises a starting point and an ending point for a route;
    generating a set of potential transportation plans for the route;
    determining an estimated travel time and an estimated fuel consumption for at least a first subset of plans in the set of potential transportation plans;
    estimating an impact on a transportation system of at least a second subset of plans in the set of potential transportation plans, wherein the second subset of plans comprise one or more modes of transportation that are different than a mode of transportation of the first subset of plans and wherein the impact on the transportation system comprises a corresponding change in emissions caused by a selection of each of the second subset of plans over the first subset of plans; and
    selecting a plan based at least in part on the estimated time, the estimated fuel, and the estimated impact on the transportation system to generate a selected plan.

2. The method of claim 1, wherein determining the estimated travel time and the estimated fuel consumption comprises simulating the potential transportation plans across a transportation system.

3. The method of claim 1, further comprising generating an overall utility score of a first potential transportation plan of the set of transportation plans based on a user profile of the user.

4. The method of claim 3, further comprising generating a utility model based on the user profile, wherein the user profile comprises explicit and inferred data regarding the user and the utility score is generated based on the utility model.

5. The method of claim 1, wherein generating the set of potential transportation plans comprises generating one or more multi-modal transportation plans based on transportation modes available near the route.

6. The method of claim 1, further comprising providing the estimated plan to a user device through a user interface.

7. The method of claim 1, further comprising:
    receiving an indication of acceptance of the selected plan; and
    providing the route to the user via a navigation system.

8. The method of claim 1, wherein estimating the impact on the transportation system comprises one or more of:
    estimating an average travel time change for other subjects using the transportation system;
    estimating a fuel consumption change of the transportation system as a whole; and
    estimating a change in a number of users traveling through a region of the transportation system.

9. The method of claim 1, wherein the transportation system comprises a number of transportation modes providing transportation options for travelers in a geographic region.

10. A system comprising:
a memory device; and
a processing device operatively coupled to the memory device, wherein the processing device is to:
receive a request for a transportation plan for a user, wherein the request comprises a starting point and an ending point for a route;
generate a set of potential transportation plans for the route;
determine a utility score for at least a first subset of plans in the set of potential transportation plans based on a utility model for the user;
estimate an impact on a transportation system of at least a second subset of plans in the set of potential transportation plans, wherein the second subset of plans comprise one or more modes of transportation that are different than a mode of transportation of the first subset of plans and wherein the impact on the transportation system comprises a corresponding change in emissions caused by a selection of each of the second subset of plans over the first subset of plans; and
select a plan based at least in part on the utility score and the estimated impact on the transportation system to generate a selected plan.

11. The system of claim 10, wherein to determine the utility score, the processing device is further to estimate a travel time or a fuel consumption for the first subset of plans in the set of potential transportation plans.

12. The system of claim 10, wherein to determine the estimated travel time and the estimated fuel consumption the processing device is further to simulate the potential transportation plans across a transportation system.

13. The system of claim 10, wherein the processing device is further to generate the utility model based on a user profile, wherein the user profile comprises explicit and inferred data regarding the user and the utility score is generated based on the utility model.

14. The system of claim 10, wherein to generate the set of potential transportation plans the processing device is further to generate one or more multi-modal transportation plans based on transportation modes available near the route.

15. The system of claim 10, wherein the processing device is further to provide the estimated plan to the user through a user interface.

16. The system of claim 10, wherein the processing device is further to:
receive an indication that the user accepts the selected plan; and
provide the route to the user via a navigation system.

17. The system of claim 10, wherein to estimate the impact on the transportation system the processing device is further to:
estimate an average travel time change for other subjects using the transportation system; and
estimate a fuel consumption change of the transportation system as a whole.

18. A non-transitory computer-readable medium having instructions stored thereon that, when executed by a processing device, cause the processing device to:
receive a request for a transportation plan for a user, wherein the request comprises a starting point and an ending point for a route;
generate a set of potential multi-modal transportation plans for the route;
determine an estimated travel time and an estimated fuel consumption for at least a first subset of plans in the set of potential multi-modal transportation plans;
estimate an impact on a transportation system of at least a second subset of plans in the set of potential multi-modal transportation plans, wherein the second subset of plans comprise one or more modes of transportation that are different than a mode of transportation of the first subset of plans and wherein the impact on the transportation system comprises a corresponding change in emissions caused by a selection of each of the second subset of plans over the first subset of plans; and
select a selected plan based at least in part on the estimated time, the estimated fuel, and the estimated impact on the transportation system to generate a selected plan.

19. The non-transitory computer-readable medium of claim 18 wherein the processing device is further to generate a utility score of a first potential multi-modal transportation plan of the set of multi-modal transportation plans based on a user profile of the user.

20. The non-transitory computer-readable medium of claim 19, wherein the processing device is further to generate a utility model based on the user profile, wherein the user profile comprises explicit and inferred data regarding the user and the utility score is generated based on the utility model.

* * * * *